Feb. 10, 1942.　　　　S. S. FIERKE　　　　2,272,191
DISPERSING MIXTURES OF RESINS AND COLORING MATERIALS IN GELATIN
Filed Dec. 26, 1940
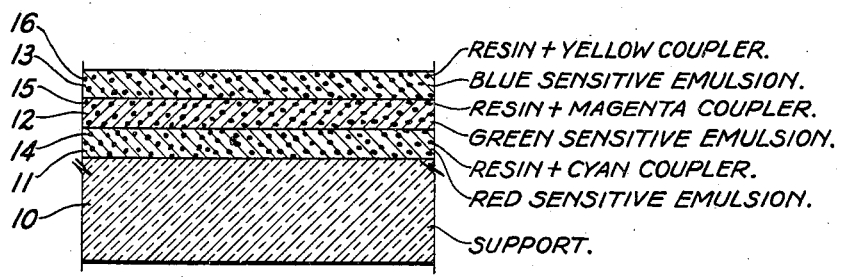
SCHEURING S. FIERKE
INVENTOR
BY
ATTORNEYS Patented Feb. 10, 1942

2,272,191

UNITED STATES PATENT OFFICE 2,272,191

DISPERSING MIXTURES OF RESINS AND COLORING MATERIALS IN GELATIN

Scheuring S. Fierke, Rochester, N. Y., assignor to Eastman Kodak Company, Rochester, N. Y., a corporation of New Jersey Application December 26, 1940, Serial No. 371,775
In Great Britain December 29, 1939

10 Claims. (Cl. 95—7)

This invention relates to color photography and particularly to a method for incorporating coloring materials such as coupling compounds in a photographic layer.

Processes of color photography in which coloring materials are incorporated in a sensitive photographic layer are well known. A process of this type which is widely used commercially involves the coupling of a color forming compound with a primary aromatic amino coupling developing agent to form a colored image. The coupling compounds used in this process are those having a reactive methylene group or a phenolic hydroxyl group which induces coupling with the oxidation product of the primary aromatic amino developing agent on photographic development. Suggestions have been made for incorporating these coupling compounds either in the developing solution or in the sensitive layer prior to exposure.

In Mannes and Godowsky U. S. application Serial No. 314,689 filed January 19, 1940, a process has been described for the incorporation of a coupling compound in an auxiliary carrier, that is, a cellulose ester such as cellulose nitrate and subsequently incorporating this auxiliary carrier containing the coupling compound in a water-soluble binder such as gelatin. The coupling compound or other coloring material is thereby rendered non-diffusing in the gelatin or other water-soluble binder and such layers may be used in multi-layer coatings for purposes of natural color photography.

I have found that coupling compounds or other coloring material such as dyes may be incorporated in a gelatin layer or gelatino silver halide emulsion by mixing them with certain synthetic resins which are insoluble in gelatin and which serve to protect the coupler or other coloring material from the action of water which would cause it to diffuse from the gelatin.

In the accompanying drawing, the single figure is a sectional view of a multi-layer coating made according to my invention.

The preparation of particles containing couplers is preferably accomplished with the aid of organic solvents. The coupler may be dissolved in a water-immiscible organic solvent and mixed with the resin in the same solvent or in a mixture of compatible solvents. This mixture is then dispersed in water containing a wetting agent and the organic solvent is slowly removed by continuous stirring on a steam bath either at normal or at reduced pressures. During the removal of the organic solvent a steady stream of air may be directed over the vessel containing the dispersion to help carry away the solvent thus evaporated. There results from this procedure a suspension of minute resin particles in water each one containing a small amount of a coupler encased within it.

The synthetic resins which I have found suitable for the preparation of my invention include polyvinyl acetal resins such as polyvinyl acetaldehyde acetal, polyvinyl acetate resins insoluble in water, coumarone indene resins and polystyrene resins. The polystyrene resins may be prepared by the polymerization of pure styrene in a known manner. The polyvinyl acetâldehyde acetal has a preferred composition of 1.4% polyvinyl acetate hydroxyl corresponding to 10.1% polyvinyl alcohol and 88.8% polyvinyl acetal. Other polyvinyl acetals soluble to some extent in a water insoluble solvent such as butyl acetate can be employed. With polyvinyl acetaldehyde acetal, the preferred solution used in our invention contains 40 grams of polyvinyl acetal and 200 grams of polyvinyl acetate although other compositions can be used as indicated by the following specific examples. The preferred polyvinyl acetate is one having an acetal content of approximately 50% and is dissolved to the amount of 65 grams in 195 grams of n-butyl acetate. The coumarone indene resin is a commercial product sold under the name Nevillite, but, since it fluoresces markedly in the presence of ultra-violet light, I believe that not all of the unsaturated groups have been reduced. A solution of 65 grams of coumarone indene resin in 195 grams of n-butylacetate is suitable.

Other resins which may be used include the methacrylates such as polymethyl methacrylate or polybutyl methacrylate.

The following examples will serve to illustrate my invention:

EXAMPLE 1

The coupling compound 2-cyanoacetylnaphthalenesulfone-N-methylanilide in the amount of 0.5 gram is dissolved in 25 cc. of warm butyl acetate and mixed by stirring with 2 grams of polyvinylacetaldehyde acetal resin in 140 cc. of butyl acetate. This resin coupler mixture is poured into 225 cc. of water containing 0.5 gram of Arctic Syntex T (U. S. Patent 1,932,180) and the mixture of resin and coupler in butyl acetate is dispersed in minute particles in water by mechanical means. The organic solvent is then removed by continuous stirring and warming resulting in a suspension of coupler encased in resin particles in a small volume of water. The final volume of this dispersion varies between 30 and 50 cc. The water dispersion of minute coupler particles in resin is then incorporated in 150–170 cc. of a gelatino silver halide emulsion and coated on a suitable support.

EXAMPLE 2

A similar coating is made using as the coupler 0.5 gram of 5-diamylnaphthalene sulfonamido-1-naphthol which is dissolved in 25 cc. of warm butyl acetate and mixed by stirring with 2 grams of polyvinyl acetate having an acetyl content of 50% in 140 cc. of butyl acetate. The mixture of resin and coupler is poured into 225 cc. of water containing 0.5 gram of Gardinol and the mixture of resin-coupler in butyl acetate is dispersed in minute particles in water by mechanical means as in the case of Example 1, the organic solvent removed and the dispersion incorporated in a gelatino silver halide emulsion and coated.

In place of the couplers referred to in the specific examples, I may use any of the couplers described in Vittum and Weissberger U. S. application Serial No. 314,679, filed January 19, 1940.

The dispersion of resin and coupler may also contain any of the following porosity modifiers or similar compounds, as described in Mannes and Godowsky U. S. application Serial No. 314,689, in amounts ranging from 5% to 50% of the amount of resin.

*Ethers*

Ethylene glycol monobenzyl ether
Diethylene glycol monobutyl ether
Diethylene glycol monobutyl ether monoacetate
Diethylene glycol monoethyl ether
Diethylene glycol diethyl ether
Ethylene glycol monophenyl ether

*Phthalate esters*

Dimethyl phthalate
Dibutyl phthalate
Benzyl phthalate
β-Ethoxyethyl phthalate

*Alcohols*

Heptadecanol
N-hexanol
Octyl alcohol

*Miscellaneous esters*

Benzyl benzoate
Triphenyl phosphate
Tricresyl phosphate
Ethyl palmitate
Methyl abietate
β-Ethoxyethyl sebacate
β-Ethoxyethyl maleate
β-Ethoxyethyl adipate
Ethylene glycol dilaurate

*Miscellaneous compounds* p-Toluenesulfonanilide
Tripropionin
Trivalerin
Monoacetin
Triacetin

The emulsions made according to my invention may be used in single layer or in multi-layer coatings on supports of glass, cellulose ester, synthetic resins, metal or paper. The accompanying drawing illustrates a coating of multi-layer material in which the support 10 of any suitable material such as cellulose acetate or paper is coated with emulsion layers 11, 12 and 13, sensitive, respectively, to the red, green and blue spectral regions. These are silver halide emulsions prepared and sensitized in known manner. The red-sensitive emulsion layer 11 contains particles 14 of resin and cyan or blue-green coupler, emulsion layer 12 contains particles 15 of resin and magenta coupler and emulsion layer 13 contains particles 16 of resin and yellow coupler. Where I refer to cyan coupler, magenta coupler and yellow coupler, it is to be understood that these are couplers such as referred to above which are not themselves colored but which produce the usual type of azomethine, indamine, or indophenol dye upon development in a primary aromatic amino coupling developer such as diethyl-p-phenylenediamine. The resin mixed with the coupler may be the same resin in the case of each emulsion layer or different resins may be used for each layer. The film may also contain the usual yellow filter layer (not shown) between emulsion layers 12 and 13 to prevent the action of blue light on emulsion layers 11 and 12.

Modifications may be made in my invention within the scope of the appended claims.

I claim:

1. The method of producing a color-forming photographic layer which comprises mixing, in an organic solvent for both, a synthetic resin selected from the group consisting of polyvinyl acetal, polyvinyl acetate, reduced coumarone indene and polystyrene, with a coloring material and dispersing the mixture of synthetic resin and coloring material in a gelatino silver halide emulsion.

2. The method of producing a color-forming photographic layer, which comprises mixing, in an organic solvent for both, a synthetic resin selected from the group consisting of polyvinyl acetal, polyvinyl acetate, reduced coumarone-indene, and polystyrene, with a color-forming compound capable of reacting with a primary aromatic amino developing agent on photographic development, and dispersing the mixture of synthetic resin and color-forming compound in a gelatino-silver halide emulsion.

3. The method of producing a color-forming photographic layer which comprises dissolving in a common solvent a synthetic resin selected from the group consisting of polyvinyl acetal, polyvinyl acetate, reduced coumarone indene and polystyrene with a color-forming compound capable of reacting with a primary aromatic amino developing agent on photographic development, dispersing the mixture of resin and color-forming compound in an aqueous solution containing a wetting agent, evaporating the solvent from the dispersion and mixing the dispersion with a gelatino silver halide emulsion.

4. The method of producing a color-forming photographic layer which comprises dissolving in a common solvent a polyvinyl acetal resin with a color-forming compound capable of reacting with a primary aromatic amino developing agent on photographic development, dispersing the mixture of resin and color forming compound in an aqueous solution containing a wetting agent, evaporating the solvent from the dispersion and mixing the dispersion with a gelatino silver halide emulsion.

5. The method of producing a color-forming photographic layer which comprises dissolving in a common solvent a polyvinyl acetate resin with a color-forming compound capable of reacting with a primary aromatic amino developing agent on photographic development, dispersing the mixture of resin and color-forming compound in an aqueous solution containing a wetting agent, evaporating the solvent from the dispersion and mixing the dispersion with a gelatino silver halide emulsion.

6. The method of producing a color-forming photographic layer which comprises dissolving in butyl acetate a polyvinyl acetal resin and a color-forming compound capable of reacting with a primary aromatic amino developing agent on photographic development, dispersing the mixture in an aqueous solution containing a wetting agent, evaporating the butyl acetate from the dispersion by heating, and mixing the dispersion with a gelatino silver halide emulsion.

7. The method of producing a color-forming photographic layer which comprises dissolving in butyl acetate a polyvinyl acetate resin and a color forming compound capable of reacting with a primary aromatic amino developing agent on photographic development, dispersing the mixture in an aqueous solution containing a wetting agent, evaporating the butyl acetate from the dispersion by heating, and mixing the dispersion with a gelatino silver halide emulsion.

8. A photographic element comprising finely divided particles of synthetic resin and a coloring material dispersed in a water-swellable colloidal medium, said resin being selected from the group consisting of polyvinyl acetal, polyvinyl acetate, reduced coumarone indene and polystyrene resins.

9. A light-sensitive element for producing a colored image, comprising finely-divided particles of synthetic resin and a coloring material, dispersed in a water-swellable colloidal medium, said resin being selected from the group consisting of polyvinyl acetal, polyvinyl acetate, reduced coumarone-indene, and polystyrene, said element containing sensitive silver halide grains.

10. A light-sensitive element for producing a colored image comprising finely divided particles of synthetic resin and a color-forming compound capable of reacting with a primary aromatic amino developing agent on photographic development, dispersed in gelatin, said resin being selected from the group consisting of polyvinyl acetal, polyvinyl acetate, reduced coumarone-indene and polystyrene, said element containing sensitive silver halide grains.

SCHEURING S. FIERKE.